(12) United States Patent
Matsuda et al.

(10) Patent No.: US 12,625,988 B2
(45) Date of Patent: May 12, 2026

(54) COMMUNICATION DEVICE, TERMINAL DEVICE, NON-TRANSITORY COMPUTER-READABLE RECORDING MEDIUM STORING COMPUTER-READABLE INSTRUCTIONS THEREOF AND CONTROL METHOD THEREOF

(71) Applicant: BROTHER KOGYO KABUSHIKI KAISHA, Nagoya (JP)

(72) Inventors: Munehisa Matsuda, Nagoya (JP); Koki Izumi, Nagoya (JP); Satoshi Matsushita, Nagoya (JP); Satoru Yanagi, Obu (JP); Kiyotaka Ohara, Nagoya (JP); Katsunori Enomoto, Toyokawa (JP); Yuki Yada, Kuwana (JP); Kyohei Mori, Nagoya (JP); Hideki Nogawa, Nagoya (JP); Tetsuya Okuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 205 days.

(21) Appl. No.: 18/355,512

(22) Filed: Jul. 20, 2023

(65) Prior Publication Data

US 2024/0037261 A1      Feb. 1, 2024

(30) Foreign Application Priority Data

Jul. 29, 2022      (JP) ................................. 2022-121740

(51) Int. Cl.
*G06F 21/62* (2013.01)

(52) U.S. Cl.
CPC ............................... *G06F 21/6218* (2013.01)

(58) Field of Classification Search
CPC .................................................. G06F 21/6218
See application file for complete search history.

(56) References Cited

U.S. PATENT DOCUMENTS 4,713,753 A * 12/1987 Boebert .................. G06F 21/71
340/5.74
5,572,195 A * 11/1996 Heller ..................... H04L 41/26
342/451

(Continued)

FOREIGN PATENT DOCUMENTS

JP        2008059245 A        3/2008
JP        2008065833 A        3/2008

(Continued)

OTHER PUBLICATIONS

Extended European Search Report dated Jan. 15, 2024 from related EP 23 18 7891.9.

*Primary Examiner* — Jason Chiang
(74) *Attorney, Agent, or Firm* — Scully, Scott, Murphy & Presser, P.C.

(57) ABSTRACT

A communication device may include: a database storing, for each of a plurality of OIDs of MIB, a value in association with the OID; and a controller configured to execute access to a value in the database according to an access request, wherein in a case where the access request includes a first OID and the user of a terminal device is not authenticated as a specific user, the controller executes access to the first value, and in a case where the access request includes a second OID and the user of the terminal device is not authenticated as the specific user, the access to the second value is not executed.

20 Claims, 13 Drawing Sheets

Communication System 2

(56) References Cited

U.S. PATENT DOCUMENTS

| | | | |
|---|---|---|---|
| 8,966,076 B2 | 2/2015 | Kawana et al. | |
| 9,300,546 B2 * | 3/2016 | Ogata | H04L 69/22 |
| 10,924,323 B1 * | 2/2021 | Chandrasekharan | G06F 16/90335 |
| 11,270,020 B1 * | 3/2022 | Carru | H04L 9/3213 |
| 2003/0018829 A1 * | 1/2003 | Carney | G06F 9/542 |
| | | | 719/321 |
| 2005/0154921 A1 * | 7/2005 | Medvinsky | G06F 21/10 |
| | | | 726/4 |
| 2007/0150299 A1 * | 6/2007 | Flory | H04L 63/20 |
| | | | 705/344 |
| 2007/0156880 A1 * | 7/2007 | Kim | H04L 41/0213 |
| | | | 709/223 |
| 2008/0065784 A1 | 3/2008 | Motoyama et al. | |
| 2008/0232271 A1 * | 9/2008 | Onishi | H04L 41/0816 |
| | | | 370/254 |
| 2010/0082730 A1 * | 4/2010 | Fujimori | H04L 41/0226 |
| | | | 709/208 |
| 2010/0243731 A1 | 9/2010 | Sawada et al. | |
| 2012/0030327 A1 * | 2/2012 | Conrad | H04L 41/0213 |
| | | | 709/223 |
| 2013/0204398 A1 * | 8/2013 | Minamizawa | H04L 63/101 |
| | | | 700/11 |
| 2013/0326227 A1 | 12/2013 | Asano | |
| 2015/0295912 A1 | 10/2015 | Asano | |
| 2016/0216981 A1 * | 7/2016 | Yamada | G06F 9/44526 |
| 2017/0163622 A1 | 6/2017 | Asano | |
| 2018/0262510 A1 * | 9/2018 | Su | G06F 21/6218 |
| 2018/0332020 A1 | 11/2018 | Asano | |
| 2019/0109852 A1 * | 4/2019 | Ranganathan | G06F 21/6218 |
| 2019/0258441 A1 * | 8/2019 | Inoue | H04W 12/35 |
| 2020/0128149 A1 | 4/2020 | Sasaki | |
| 2021/0286861 A1 * | 9/2021 | Churchill | G06F 21/31 |
| 2022/0043902 A1 * | 2/2022 | Olson | H04L 9/30 |
| 2022/0329473 A1 * | 10/2022 | Faircloth | H04L 41/0886 |

FOREIGN PATENT DOCUMENTS

| | | | |
|---|---|---|---|
| JP | 2013246799 A | 12/2013 | |
| JP | 2020065208 A | 4/2020 | |

* cited by examiner

Communication System 2

100

Acquisition and Writing of Value

10

LAN 4

FIG. 5

(First Embodiment)

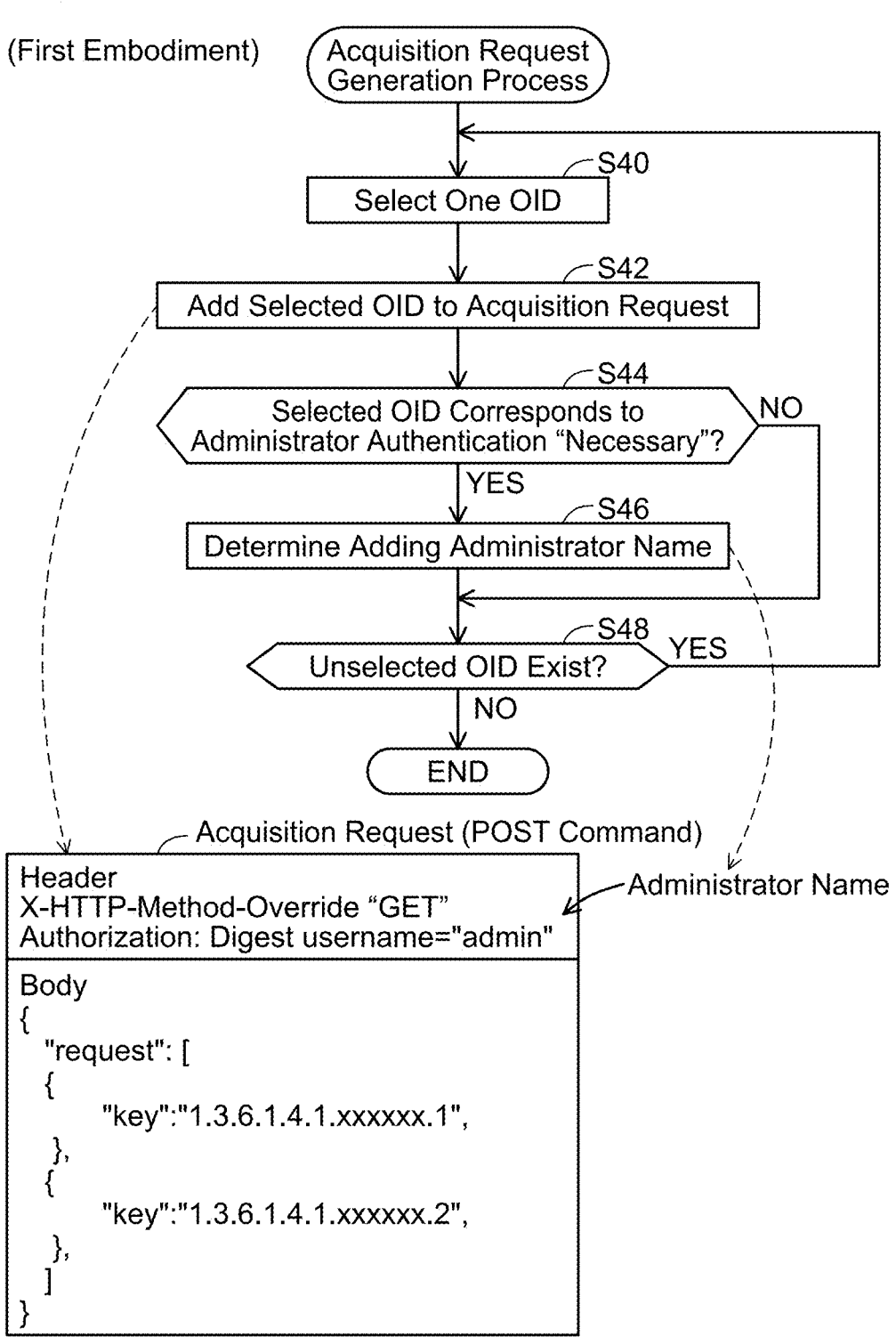

Acquisition Request
Generation Process

S40
Select One OID

S42
Add Selected OID to Acquisition Request

S44
Selected OID Corresponds to
Administrator Authentication "Necessary"?   NO

YES

S46
Determine Adding Administrator Name

S48
Unselected OID Exist?   YES

NO

END

Acquisition Request (POST Command)

Administrator Name

```
Header
X-HTTP-Method-Override "GET"
Authorization: Digest username="admin"

Body
{
   "request": [
   {
       "key":"1.3.6.1.4.1.xxxxxx.1",
   },
   {
       "key":"1.3.6.1.4.1.xxxxxx.2",
   },
   ]
}
```

FIG. 6

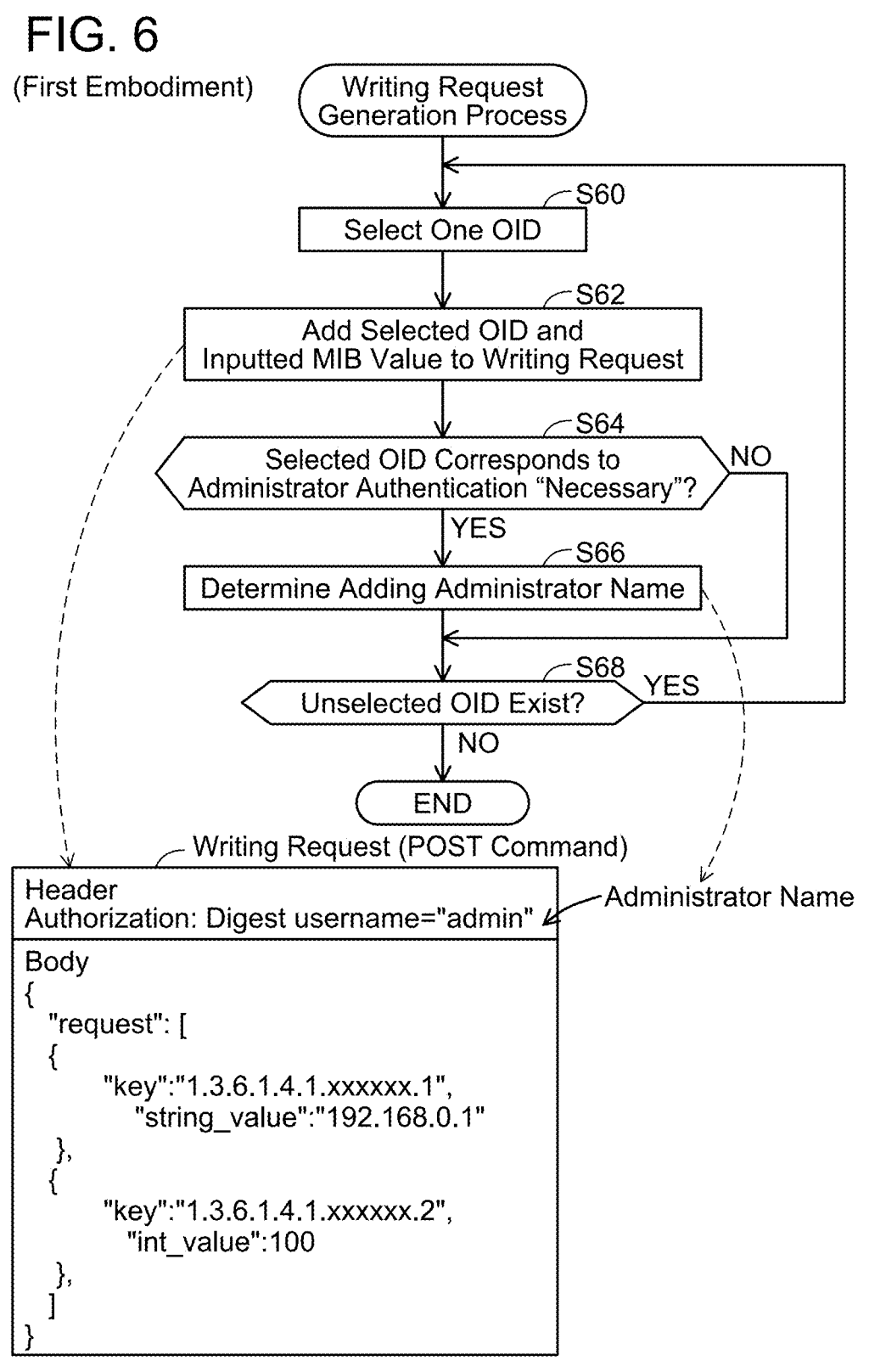

(First Embodiment)

```
Writing Request
Generation Process
```

↓

S60
Select One OID

↓

S62
Add Selected OID and
Inputted MIB Value to Writing Request

↓

S64
Selected OID Corresponds to
Administrator Authentication "Necessary"? —— NO

YES ↓

S66
Determine Adding Administrator Name

↓

S68
Unselected OID Exist? —— YES

NO ↓

END

— Writing Request (POST Command)

```
Header
Authorization: Digest username="admin"          —Administrator Name

Body
{
   "request": [
   {
        "key":"1.3.6.1.4.1.xxxxxx.1",
          "string_value":"192.168.0.1"
   },
   {
        "key":"1.3.6.1.4.1.xxxxxx.2",
          "int_value":100
   },
   ]
}
```

(First Embodiment)

(First Embodiment)

(Second Embodiment)

(Second Embodiment)

(Second Embodiment)

(Second Embodiment)

COMMUNICATION DEVICE, TERMINAL DEVICE, NON-TRANSITORY COMPUTER-READABLE RECORDING MEDIUM STORING COMPUTER-READABLE INSTRUCTIONS THEREOF AND CONTROL METHOD THEREOF

REFERENCE TO RELATED APPLICATION

This application claims priority from Japanese Patent Application No. 2022-121740 filed on Jul. 29, 2022. The entire content of the priority application is incorporated herein by reference.

BACKGROUND ART

A peripheral device including an MIB (Management Information Base) database is known.

DESCRIPTION

Values with different security levels coexist in an MIB database. The disclosure herein provides technologies for accessing to an MIB database with consideration given to coexistence of values with different security levels.

A communication device disclosed herein may comprise a database storing, for each of a plurality of object IDs (OIDs) of Management Information Base (MIB), a value in association with the OID; and a controller. The controller may be configured to: receive an access request from a terminal device, the access request being for requesting access to a value in the database, and the access request including one or more OIDs among the plurality of OIDs; and in a case where the access request is received from the terminal device, execute access to a value in the database according to the access request, wherein in a case where the access request includes a first OID among the plurality of OIDs and a user of the terminal device is authenticated as a specific user, the controller executes access to a first value stored in the database in association with the first OID, in a case where the access request includes a second OID among the plurality of OIDs, which is different from the first OID, and the user of the terminal device is authenticated as the specific user, the controller executes access to a second value stored in the database in association with the second OID, in a case where the access request includes the first OID and the user of the terminal device is not authenticated as the specific user, the controller executes access to the first value in the database, and in a case where the access request includes the second OID and the user of the terminal device is not authenticated as the specific user, the access to the second value in the database is not executed.

Also disclosed herein is a non-transitory computer-readable recording medium storing computer-readable instructions for a terminal device. The computer-readable instructions, when executed by a processor of the terminal device, may cause the terminal device to: send an access request to a communication device, the access request being a command for requesting access to a value in a database of the communication device, the database storing, for each of a plurality of object IDs (OIDs) of Management Information Base (MIB), a value in association with the OID, and the access request including one or more OIDs among plurality of OIDs that are specified by an user of the terminal device; and receive a response to the access request from the communication device, wherein in a case where the access request includes a first OID among the plurality of OIDs and the user of the terminal device is authenticated as a specific user, the response includes first information indicating that access to a first value stored in the database in association with the first OID has succeeded, in a case where the access request includes a second OID among the plurality of OIDs, which is different from the first OID, and the user of the terminal device is authenticated as the specific user, the response includes second information indicating that access to a second value stored in the database in association with the second OID has succeeded, in a case where the access request includes the first OID and the user of the terminal device is not authenticated as the specific user, the response includes the first information, and in a case where the access request includes the second OID and the user of the terminal device is not authenticated as the specific user, the response does not include the second information.

For example, it can be conceived that the second value has a higher security level than the first value. According to the configuration above, access to the first value is permitted regardless of whether the user of the terminal device is authenticated as the specific user or not, whereas access to the second value is not permitted unless the user of the terminal device is authenticated as the specific user. Access to an MIB database can be realized with consideration given to coexistence of values with different security levels.

A computer program for implementing the above-described communication device and a computer-readable storage medium storing the computer program are also novel and useful. Further, a method performed by the above-described communication device is novel and useful. Further, the above-described terminal device and a computer program for implementing the terminal device are also novel and useful. Further, a method performed by the above-described terminal device is novel and useful.

FIG. 5 illustrates a flowchart of an acquisition request generation process.

FIG. 6 illustrates a flowchart of a writing request generation process.

Figure 1:
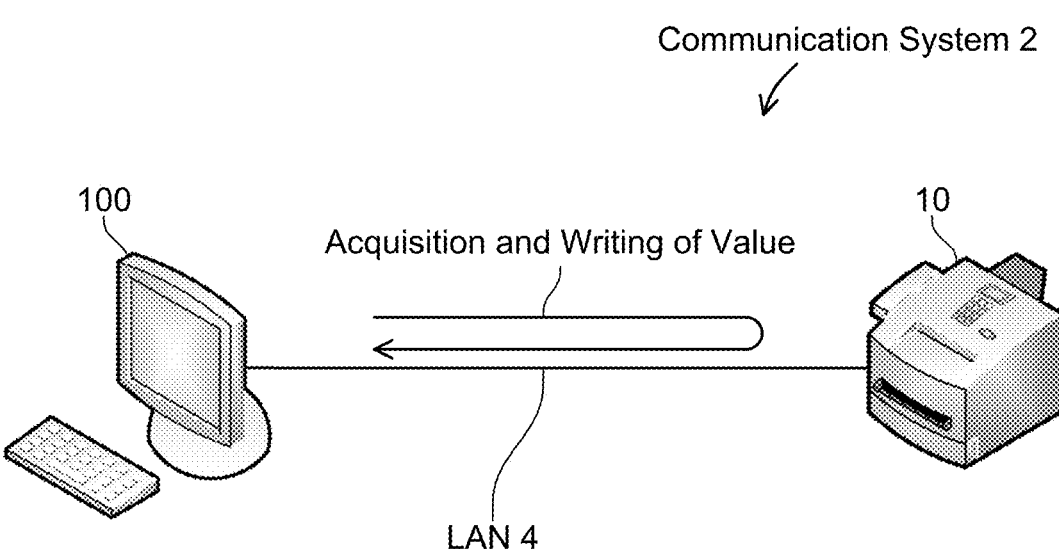
FIG. 1 illustrates a configuration of a communication system.

(First Embodiment) (Configuration of Communication System 2; FIG. 1) As illustrated in FIG. 1, a communication system 2 comprises a printer 10 and a terminal device 100. The devices 10, 100 are connected to a LAN (local area network) 4 and communicable with each other via the LAN 4. The LAN 4 may be a wired LAN or a wireless LAN. In the present embodiment, the printer 10 writes and sends information according to requests from the terminal device 100. In the present embodiment, an acquisition request for acquiring information and a writing request for writing information are commands according to HTTPS (Hypertext Transfer Protocol Secure).

Figure 2:
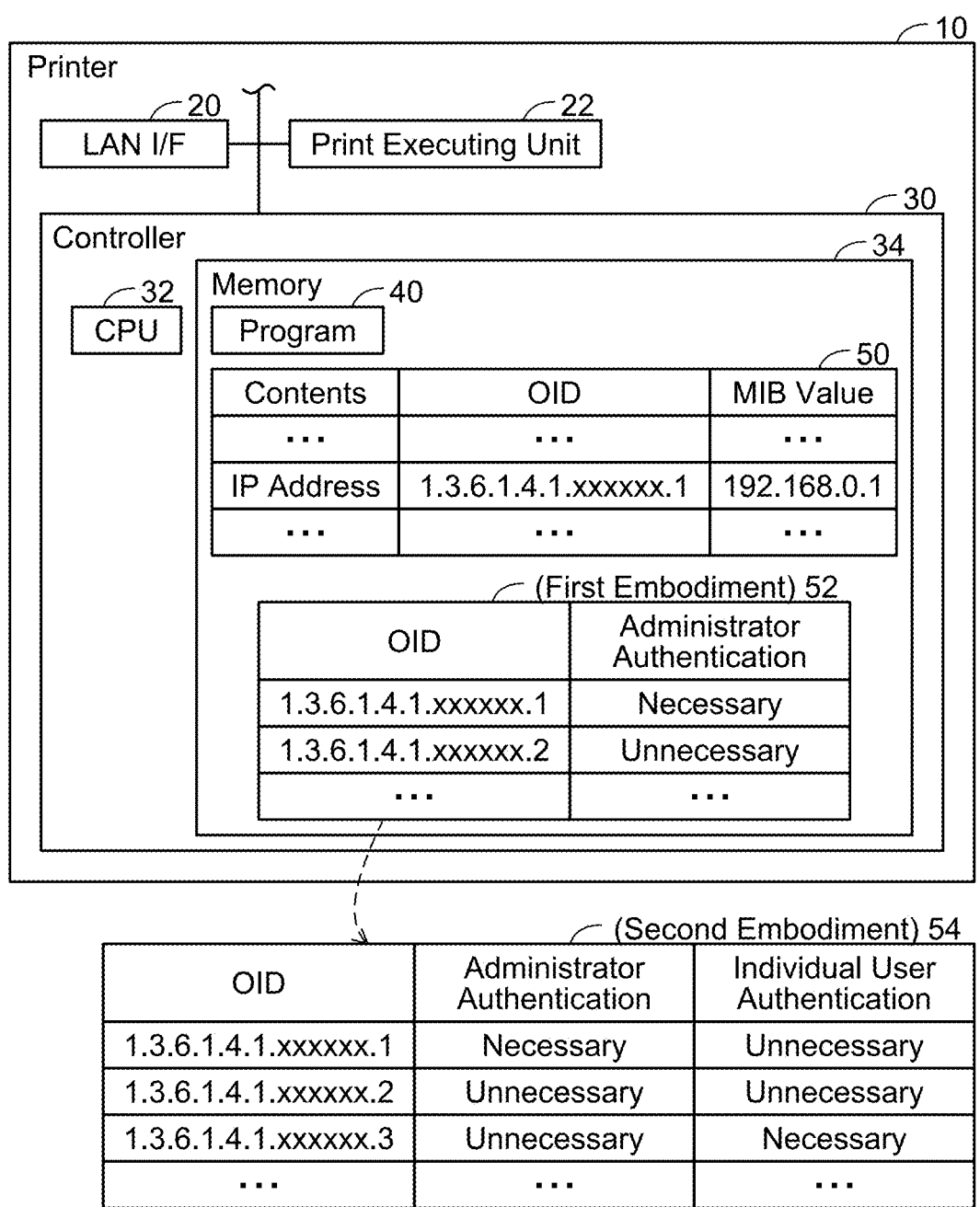
FIG. 2 illustrates a block diagram of a printer.

(Configuration of Printer 10; FIG. 2) The printer 10 is a peripheral device (e.g., a peripheral device of the terminal device 100) configured to execute a print function. In a modification, the printer 10 may be a multifunctional device configured to execute a scan function, a FAX function, etc. in addition to the print function. The printer 10 comprises a LAN interface 20, a print executing unit 22, and a controller 30. The units 20 to 30 are connected to a bus line (reference sign omitted). Hereinafter, "interface" may be abbreviated as "I/F".

The LAN I/F 20 is for communication via the LAN 4 and is connected to the LAN 4. The print executing unit 22 comprises a print mechanism of an inkjet scheme, laser scheme, or the like.

The controller 30 comprises a CPU 32 and a memory 34. The memory 34 is configured of a volatile memory and a non-volatile memory. The CPU 32 executes various processes according to program 40 stored in the memory 34. The memory 34 further stores a database 50 and an authentication table 52. The program 40, the database 50, and the authentication table 52 are stored, for example, in the non-volatile memory of the memory 34.

The database 50 stores various information (referred to as "MIB values" hereinafter) of the printer 10. The MIB values indicate, for example, a remaining amount in a consumable article, MAC address, name (i.e., user name), IP address, installed location, access destination, error history, status (print in progress, standby, etc.), print setting (e.g., default resolution for print), etc. of the printer 10. The database 50 stores the above-mentioned various information in a tree structure (i.e., hierarchical structure). This collection of various information in the tree structure is referred to as "MIB (Management Information Base)". Specifically, the database 50 stores a content and an OID (object ID) in association with each MIB value. The content is a character string indicating the meaning of the MIB value. The OID is an identifier for identifying the MIB value.

The authentication table 52 stores, for each of a plurality of OIDs in the database 50, the OID and an administrator authentication value in association with each other. The administrator authentication value indicates one of "Necessary" indicating that administrator authentication is necessary and "Unnecessary" indicating that administrator authentication is unnecessary.

Figure 3:
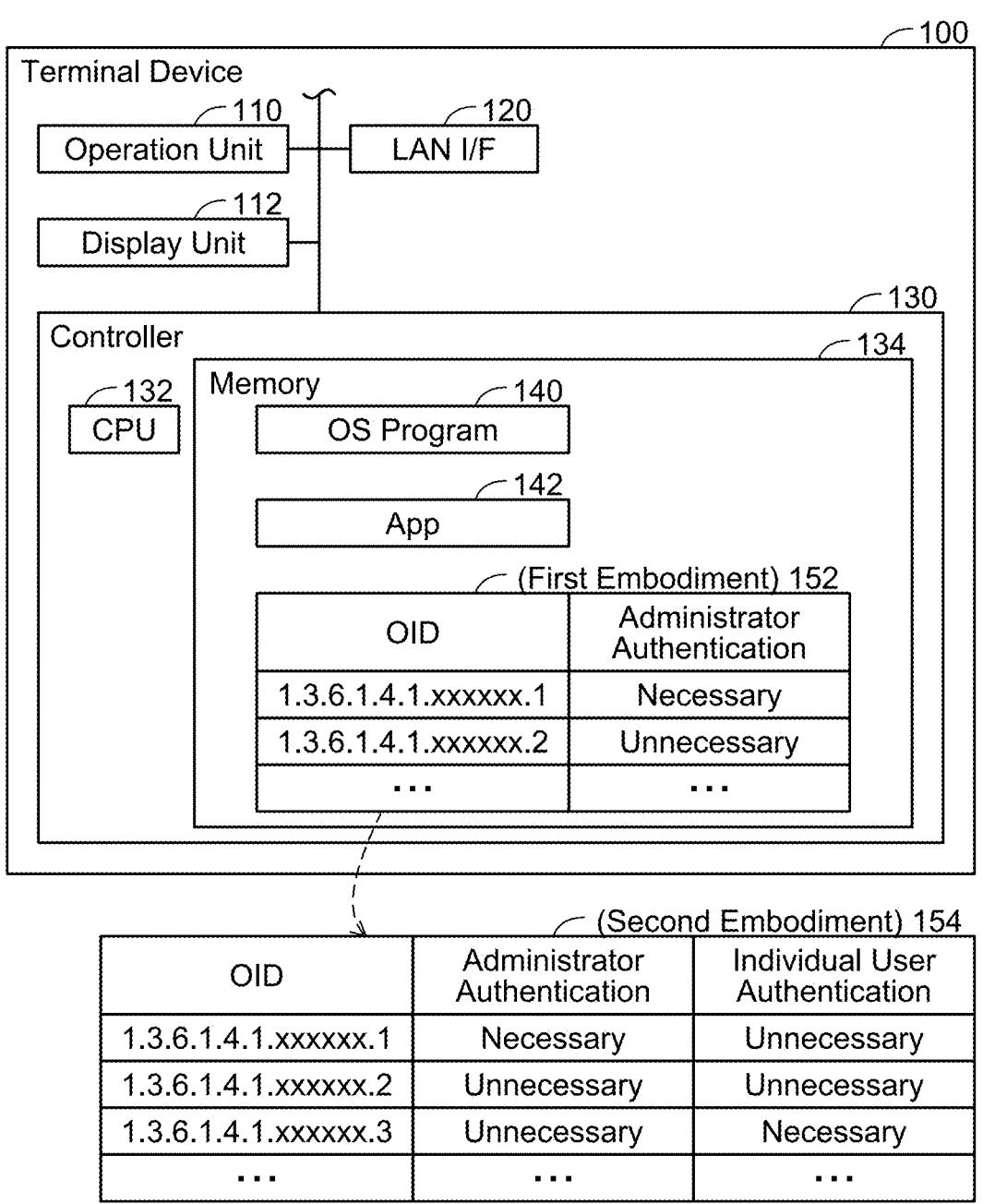
FIG. 3 illustrates a block diagram of a terminal device.

(Configuration of Terminal Device 100; FIG. 3) The terminal device 100 is a user terminal such as a desktop PC, a laptop PC, a tablet PC, a mobile phone (e.g., smartphone), or the like. The terminal device 100 comprises an operation unit 110, a display unit 112, a LAN I/F 120, and a controller 130. The operation unit 110 comprises a plurality of keys. A user can input various instructions to the terminal device 100 by operating the operation unit 110. The display unit 112 is a display configured to display various information. The display unit 112 may be a so-called touch screen (i.e., a part of the operation unit 110). The LAN I/F 120 is connected to the LAN 4.

The controller 130 comprises a CPU 132 and a memory 134. The CPU 132 executes various processes according to programs 140, 142 stored in the memory 134. An OS program 140 is a program for controlling basic operation of the terminal device 100. An application 142 is a program for sending the acquisition request and the write request to the printer 10. The application 142 is provided, for example, by the vendor of the printer 10. The application 142 is downloaded, for example, from a server on the Internet.

The memory 134 further stores an authentication table 152. The authentication table 152 is identical to the authentication table 52 of the printer 10. The authentication table 152 is stored in the memory 134 by the application 142.

(Communication Protocols between Printer 10 and Terminal Device 100) As a communication protocol for communicating MIB values of the printer 10 between the printer 10 and the terminal device 100, a protocol according to UDP (User Datagram Protocol) in the transport layer of the OSI (Open Systems Interconnection) reference model is widely known. Specifically, SNMP (Simple Network Management Protocol) is known. SNMP is SNMPv1, SNMPv2, or SNMPv2c. It can be contemplated that not only UDP but also a communication protocol according to TCP (Transmission Control Protocol) in the transport layer of the OSI reference model is used as a communication protocol for communicating MIB values. Specifically, it can be contemplated that HTTPS is used. This is because HTTPS is more secure than SNMP since it employs user authentication and encryption of communication data. Thus, it is possible to prevent MIB values of the printer 10 from being illicitly written or acquired by a third party. In a modification, HTTP, which does not use SSL (Secure Socket Layer) or TLS (Transport Layer Security), may be used.

HTTP executes user authentication using a user name (i.e., ID) and a password. Here, HTTP supports basic authentication and digest authentication. The basic authentication is a scheme for coding a user name and a password by Base64 and sending it. The digest authentication is a scheme for hashing a user name and a password and sending it. In the basic authentication, a plain text generated by coding a user name and a password by Base64 is sent, while in the digest authentication, a value generated by hashing a user name and a password is sent. Thus, the digest authentication is more secure than the basic authentication. In the present embodiment, the digest authentication is used. In a modification, the basic authentication may be used.

The HTTP user authentication allows for user authentication for a plurality of users including, for example, an administrator, an individual user, a public user, etc. The individual user is a user who is permitted by the administrator to access at least a part of the database 50 of the printer 10. The public user is a user who is different from the administrator and the individual user. Generally, privilege level of the public user is lower than privilege levels of the administrator and the individual user.

Figure 4:
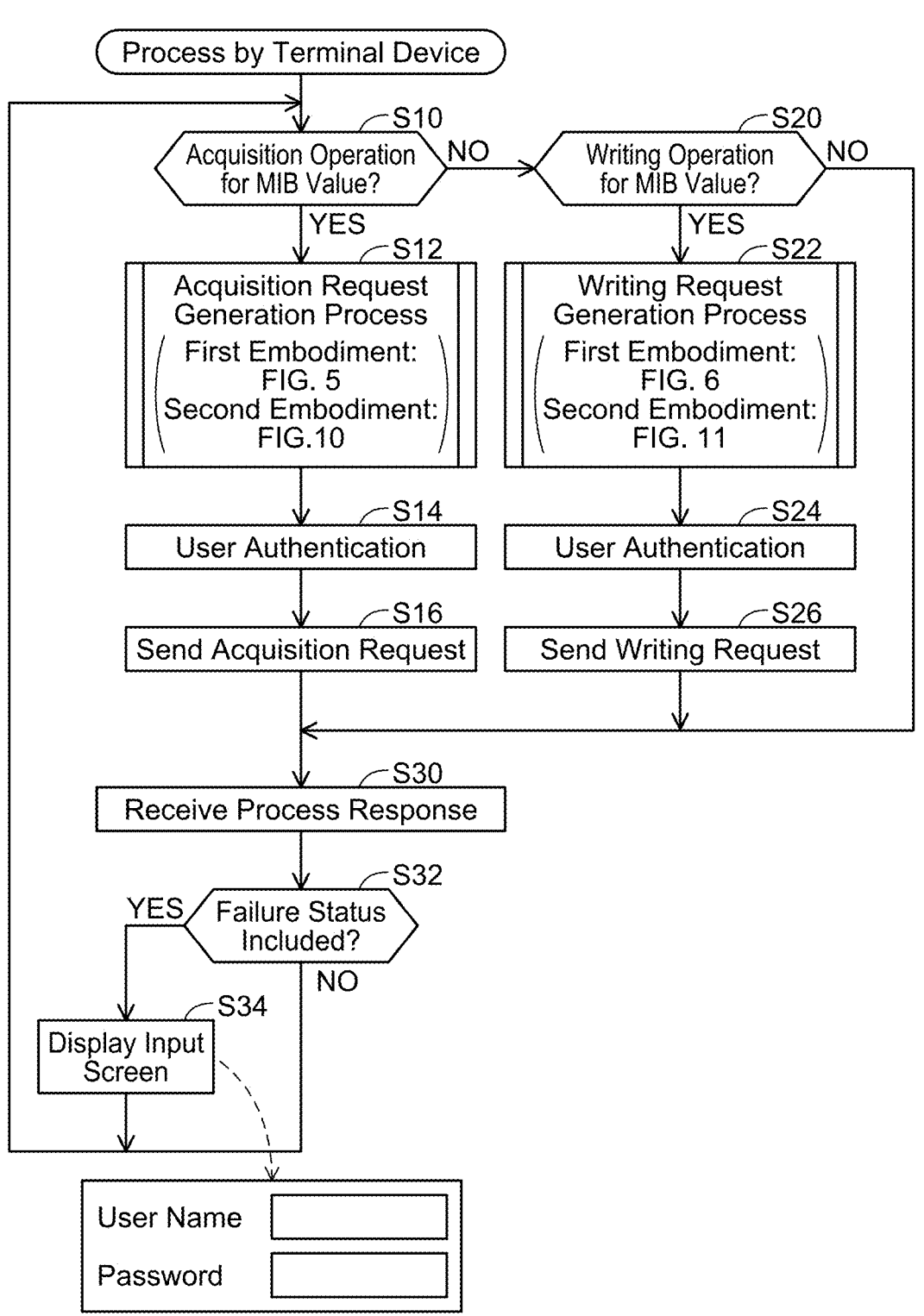
FIG. 4 illustrates a flowchart of a process by the terminal device.

(Process by Terminal Device 100; FIG. 4) Referring to FIG. 4, a process executed by the CPU 132 of the terminal device 100 according to the application 142 is described. The process of FIG. 4 is triggered by activation of the application 142. Communication between the terminal device 100 and the printer 10 is executed via the LAN I/Fs 20 and 120 and the LAN 4. Hereinafter, phrases such as "via the LAN I/F 20 (or 120)" and "via the LAN 4" will be omitted unless otherwise stated.

The CPU 132 monitors in S10 whether an acquisition operation for acquiring an MIB value of the printer 10 is performed at the operation unit 110 and monitors in S20 whether a writing operation for writing an MIB value in the printer 10 is performed at the operation unit 110. The acquisition operation includes an operation of designating one or more items from among a plurality of items (i.e., a plurality of contents) corresponding to a plurality of MIB values of the printer 10. The writing operation includes an operation of designating one or more items corresponding to one or more MIB values (i.e., IP address, setting values of print setting, etc.) to be written in the printer 10, and an operation of inputting, for each of the designated one or more items, an MBI value to be written in the printer 10. The acquisition operation and the writing operation are, for example, operations on screens displayed on a display unit 112 of the terminal device 100.

When the acquisition operation is performed at the operation unit 110 (YES in S10), the CPU 132 executes in S12 an acquisition request generation process (see FIG. 5) for generating an acquisition request according to HTTP. The acquisition request is, for example, a command according to HTTP POST method that includes a header in which "X-HTTP-Method-Override 'GET'" is written (see FIG. 5). In a modification, the acquisition request may be a command according to HTTP GET method.

In S14, the CPU 132 executes HTTP user authentication between the terminal device 100 and the printer 10. Specifically, the terminal device 100 sends a request to the printer 10 and then receives a nonce (i.e., random value) from the printer 10. The terminal device 100 displays an input screen for input of a user name and a password on the display unit 112. The terminal device 100 generates an authentication parameter including a user name inputted to the input screen and the nonce received from the printer 10. The terminal device 100 then writes the generated authentication parameter in the header of the acquisition request generated in S12 (see FIG. 5). Thus, digest authentication using the information inputted to the input screen (i.e., the user name and password) is executed when the acquisition request is sent.

In S16, the CPU 132 executes digest authentication according to the authentication parameter written in the header of the acquisition request and sends the acquisition request to the printer 10. When the digest authentication succeeds, a TLS (Transport Layer Security) session is established between the terminal device 100 and the printer 10. The acquisition request is sent to the printer 10 using the TLS session. That is, the acquisition request is encoded by TLS.

In S30 following S16, the CPU 132 receives a process response as a response to the acquisition request sent in S16. The process response is also encoded by TLS.

In S32, the CPU 132 determines whether the process response received in S30 includes a failure status. The failure status indicates that access to information in the database 50 has failed. For example, when administrator authentication is necessary and digest authentication by a user other than the administrator (e.g., public user) is executed, the process response includes the failure status.

When determining that the process response includes the failure status (YES in S32), the CPU 132 displays an input screen for input of a user name and a password on the display unit 112 in S34. This input screen is, for example, the same as the input screen displayed in S14. In this way, the user is able to know that authentication for the administrator, who is different from the user identified by the user name inputted in S14, is necessary and input an administrator name and a password. When S34 is completed, the CPU 132 returns to the monitoring in S10 and the monitoring in S20. For example, information inputted in S34 is used in S14 and S16 when these steps are executed again.

When determining that the process response does not include the failure status (NO in S32), the CPU 132 returns to the monitoring in S10 and the monitoring in S20.

When the writing operation is performed at the operation unit 110 (YES in S20), the CPU 132 executes in S22 a writing request generation process (see FIG. 6) for generating a writing request. The writing request is a command according to HTTP POST method.

S24 is the same as S14 except that the authentication parameter is written in the header of the writing request. S26 is the same as S16 except that the writing request generated in S24 is sent to the printer 10. When the writing request is sent, digest authentication is executed and the writing request is encoded by TLS.

In S30 following S26, the CPU 132 receives a process response as a response to the writing request sent in S26. The process response to the writing request is encoded by TLS.

(Acquisition Request Generation Process; FIG. 5) The acquisition request generation process of S12 in FIG. 4 is described. In S40, the CPU 132 selects one OID from among one or more OIDs corresponding to the one or more contents selected by the acquisition operation (referred to as "one or more target OIDs" hereinafter).

In S42, the CPU 132 adds the one OID selected in S40 to an acquisition request. Specifically, as illustrated in FIG. 5, a combination of "key" and the OID (e.g., "1.3.6.1.4.1.xxxxxx.1") is written in the body of the acquisition request.

In S44, the CPU 132 specifies an administrator authentication value stored in association with the one OID selected in S40 in the authentication table 152. The CPU 132 determines whether the specified administrator authentication value indicates "Necessary". When determining that the specified administrator authentication value indicates "Unnecessary" (NO in S44), the CPU 132 skips S46, which will be described later, and proceeds to S48. On the other hand, when determining that the specified administrator authentication value indicates "Necessary" (YES in S44), the CPU 132 proceeds to S46.

In S46, the CPU 132 decides that an authentication parameter including the administrator name is to be written in the header of the acquisition request. Thus, in S14 of FIG. 4, the authentication parameter including the administrator name is written in the header of the acquisition request. When S46 is completed, the CPU 132 proceeds to S48.

In S48, the CPU 132 determines whether there is an unselected OID among the one or more target OIDs. When determining that there is an unselected OID among the one or more target OIDs (YES in S48), the CPU 132 returns to S40 and selects another OID.

When determining that there is no unselected OID among the one or more target OIDs (NO in S48), the CPU 132 terminates the process of FIG. 5.

(Writing Request Generation Process; FIG. 6) The writing request generation process of S22 in FIG. 4 is described. S60 is the same as S40 in FIG. 5 except that one or more OIDs corresponding to the one or more MIB values inputted by the writing operation are used.

In S62, the CPU 132 adds the one OID selected in S60 to a writing request. Specifically, a combination of "key", the OID, and an MIB value to be written in the printer 10 (i.e., MIB value inputted by the user) is written in the body of the writing request according to HTTPS.

S64 and S66 are the same as S44 and S46 except that it is decided to write an authentication parameter including the administrator name in the header of the writing request. S68 is the same as S48.

Figure 7:
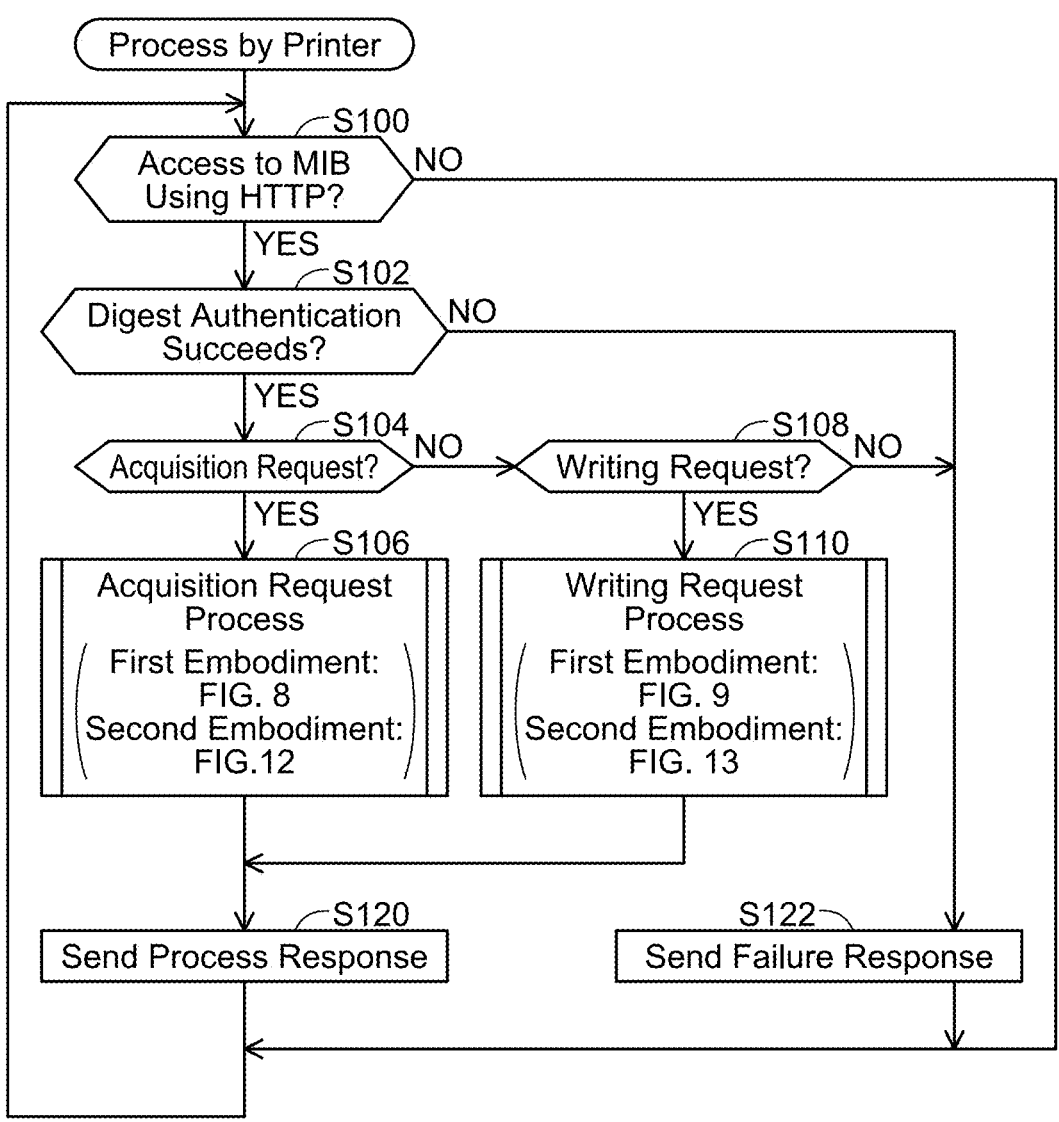
FIG. 7 illustrates a flowchart of a process by the printer.

(Process by Printer 10; FIG. 7) Referring to FIG. 7, a process executed by the CPU 32 of the printer 10 according to the program 40 is described. The process of FIG. 7 is triggered by the printer 10 being turned on.

In S100, the CPU 32 monitors whether an event of accessing the MIB database 50 using HTTP occurs. The event of S100 includes that the LAN I/F 20 receives a command according to HTTP from the terminal device 100.

When the event of S100 occurs (YES in S100), the CPU 32 executes S102 and subsequent steps. In S102, the CPU 32 determines whether the digest authentication between the terminal device 100 and the printer 10 has succeeded. When determining that the digest authentication has succeeded (YES in S102), the CPU 32 proceeds to S104.

In S104, the CPU 32 determines whether the command according to HTTP received from the terminal device 100 (referred to as "received command" hereinafter) is an acquisition request. When determining that the received command is an acquisition request (YES in S104), the CPU 32 executes in S106 an acquisition request process (see FIG. 8) according to the acquisition request. In S120 following S106, the CPU 32 sends a process response generated in the acquisition request process in S106 to the terminal device 100. When S120 is completed, the CPU 32 returns to the monitoring in S100.

When determining that the received command is not an acquisition request (NO in S104), the CPU 32 determines in S108 whether the received command is a writing request. When determining that the received command is a writing request (YES in S108), the CPU 32 executes in S110 a writing request process (see FIG. 9) according to the writing request. In S120 following S110, the CPU 32 sends a process response generated in the writing request process in S110 to the terminal device 100.

When determining that the digest authentication has failed (NO in S102) or when the received command is neither of an acquisition request nor a writing request (e.g., the received request is a request that is not supported by the printer 10) (NO in S108), the CPU 32 proceeds to S122. In S122, the CPU 32 sends a failure response to the terminal device 100. The failure response indicates that a process according to the received command has failed. When S122 is completed, the CPU 32 returns to the monitoring in S100.

Figure 8:
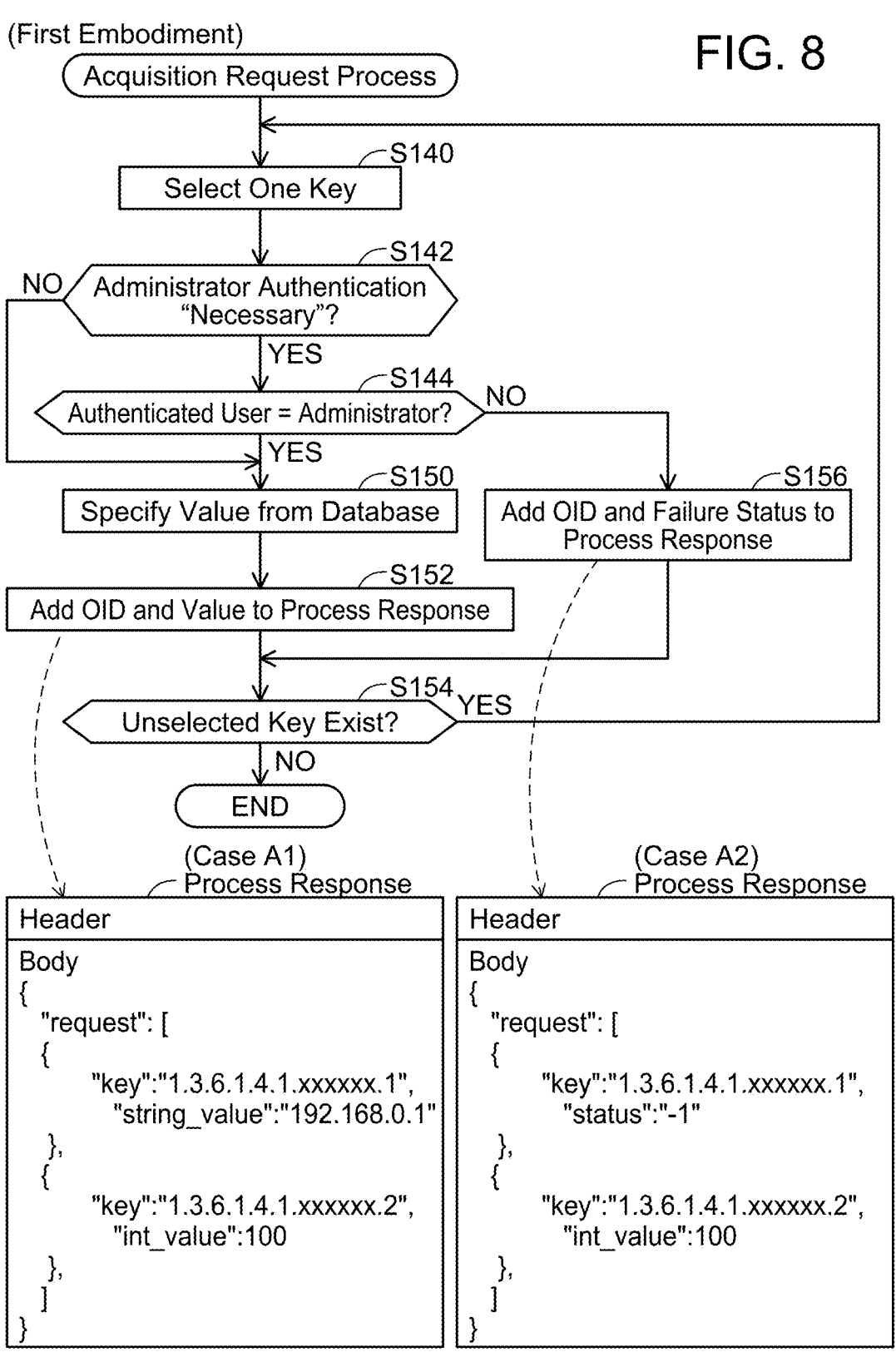
FIG. 8 illustrates a flowchart of an acquisition request process.

(Acquisition Request Process; FIG. 8) The acquisition request process of S106 in FIG. 7 is described. In S140, the CPU 32 selects one "key" from among one or more "keys" included in the acquisition request.

In S142, the CPU 32 specifies an OID associated with the one "key" selected in S140 in the acquisition request. The CPU 32 specifies an administrator authentication value stored in association with the specified OID in the authentication table 152. The CPU 32 determines whether the specified administrator authentication value indicates "Necessary". When determining that the specified administrator authentication value indicates "Unnecessary" (NO in S142), the CPU 32 skips S144, which will be described later, and proceeds to S150. On the other hand, when determining that the specified administrator authentication value indicates "Necessary" (YES in S142), the CPU 32 proceeds to S144.

In S144, the CPU 32 determines whether the user authenticated by the executed digest authentication (referred to as "authenticated user" hereinafter) is the administrator. When the administrator name is written as the authentication parameter in the header of the acquisition request, the CPU 32 determines that the authenticated user is the administrator (YES in S144) and proceeds to S150.

In S150, the CPU 32 acquires an MIB value stored in association with the specified OID from the database 50.

In S152, the CPU 32 adds the MIB value acquired in S150 to a process response to the acquisition request. Specifically, as illustrated in FIG. 8, a combination of "key", the specified OID (e.g., "1.3.6.1.4.1.xxxxxx.1"), and the acquired MIB value (e.g., IP address "192.168.0.1") is written in the body of the process response. When S152 is completed, the CPU 32 proceeds to S154.

In S154, the CPU 32 determines whether there is an unselected "key" among the one or more "keys" included in the acquisition request. When determining that there is an unselected "key" among the one or more "keys" included in the acquisition request (YES in S154), the CPU 32 returns to S140 and selects another "key".

When a user other than the administrator name (e.g., public user) is written as the authentication parameter in the header of the acquisition request, the CPU 32 determines that the authenticated user is not the administrator (NO in S144) and proceeds to S156.

In S156, the CPU 32 adds the failure status to a process response to the acquisition request. Specifically, as illustrated in FIG. 8, a combination of "key", the specified OID (e.g., "1.3.6.1.4.1.xxxxxx.1"), and the failure status (e.g., "status":"−1") is written in the body of the process response. When S156 is completed, the CPU 32 proceeds to S154.

Figure 9:
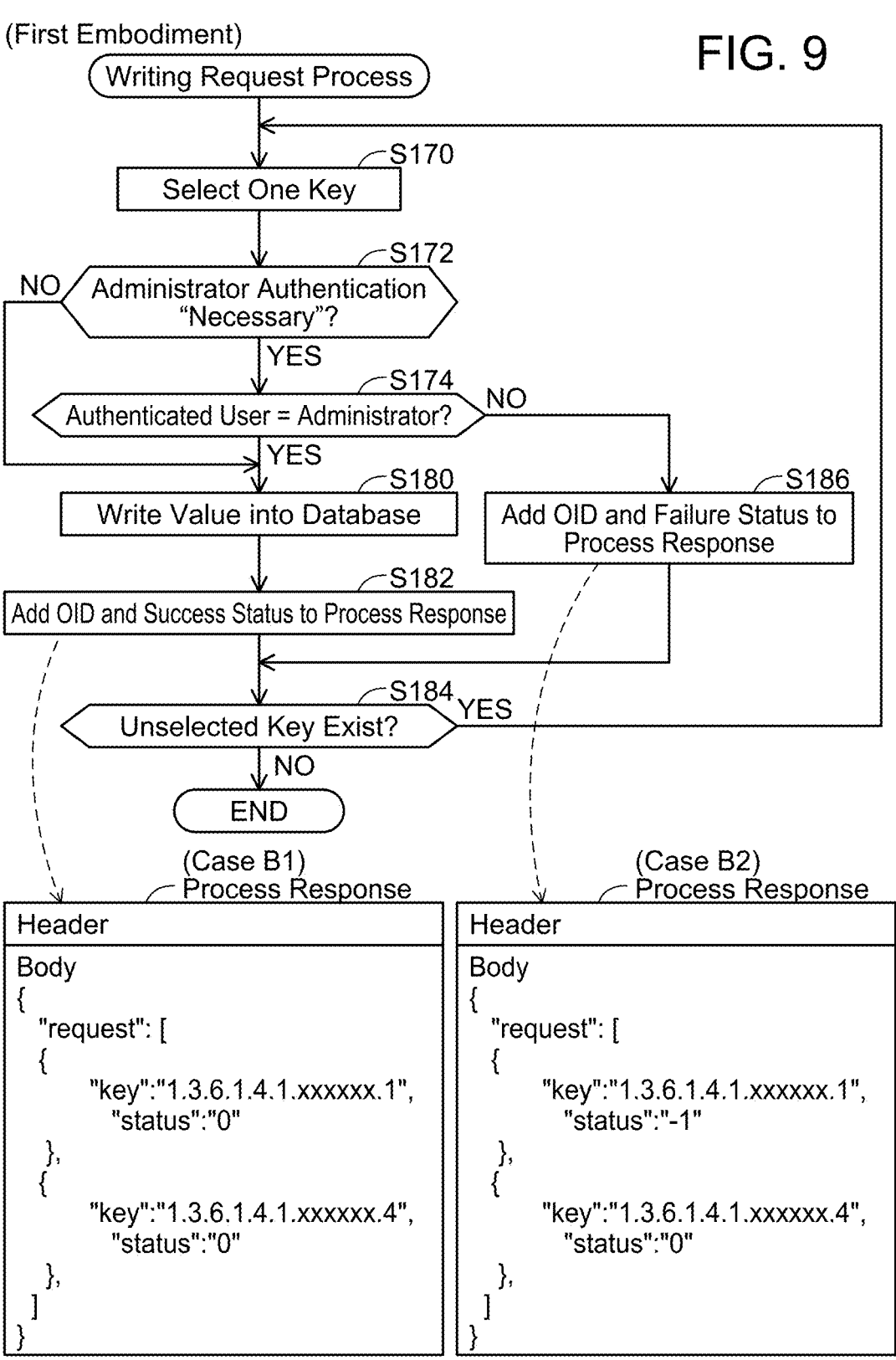
FIG. 9 illustrates a flowchart of a writing request process.

(Writing Request Process; FIG. 9) The writing request process of S110 in FIG. 7 is described. S170 to S174 are the same as S140 to S144 in FIG. 8 except that one or more "keys" included in the writing request are used.

When determining that the authenticated user is the administrator (YES in S174), the CPU 32 proceeds to S180. In S180, the CPU 32 specifies an MIB value associated with the OID specified in S172 in the writing request. The CPU 32 then writes the specified MIB value in the database 50 in association with the specified OID. In other words, the MIB value stored in association with the specified OID in the database 50 is updated to the MIB value included in the writing request.

In subsequent S182, the CPU 32 adds a success status indicating that the specified MIB value has been successfully written to a process response to the writing request. Specifically, as illustrated in FIG. 9, a combination of "key", the specified OID (e.g., "1.3.6.1.4.1.xxxxxx.1"), and the success status (e.g., "status":"0") is written in the body of the process response. When S182 is completed, the CPU 32 proceeds to S184. S184 is the same as S154 in FIG. 8 except that the one or more "keys" included in the writing request are used.

When determining that the authenticated user is not the administrator (NO in S174), the CPU 32 proceeds to S186. S186 is the same as S156 in FIG. 8 except that the process response to the writing request is used.

(Specific Cases) For example, in the authentication table 52, OIDs corresponding to MIB values with relatively high security levels are associated with the administrator authentication value "Necessary", while OIDs corresponding to MIB values with relatively low security levels are associated with the administrator authentication value "Unnecessary". The MIB values with relatively high security levels include, for example, an IP address, a MAC address, etc. The MIB values with relatively low security levels include, for example, the number of printed sheets, print settings, etc.

(Case A1; FIG. 8) As an example, Case A1 is conceived in which the user designates an IP address and the number of printed sheets as two items by the acquisition operation in S10 of FIG. 4, and the administrator name and a password are inputted for the user authentication in S14. In the present case, the terminal device 100 determines that the administrator authentication is "Necessary" for the OID of the IP address (YES in S44 of FIG. 5) and writes the administrator name in the header of the acquisition request (S46 in FIGS.

5 and S14 in FIG. 4). The terminal device 100 then sends the printer 10 the acquisition request including the OID of the IP address and the OID of the number of printed sheets (S16).

The printer 10 determines that the received command from the terminal device 100 is an acquisition request (YES in S100 and YES in S104) and determines that the digest authentication for the administrator has succeeded (YES in S102). In the present case, the printer determines that the administrator authentication is "Necessary" for the OID of the IP address (YES in S142 of FIG. 8) and further determines that the authenticated user is the administrator (YES in S144). The printer 10 then adds the OID of the IP address and the MIB value stored in association with the IP address in the database 50 to a process response (S150 and S152).

Further, the printer 10 determines that the administrator authentication is "Unnecessary" for the OID of the number of printed sheets (NO in S142), skips the determination in S144, and adds the OID of the number of printed sheets and the MIB value "100" stored in association with the number of printed sheets in the database 50 to the process response (S150 and S152).

In the present case, the authenticated user is the administrator, and thus both the MIB value of the IP address with a high security level and the MIB value of the number of printed sheets with a low security level are added to the process response to the acquisition request.

(Case A2; FIG. 8) The present case is the same as Case A1 except that a public user name and a password are inputted for the user authentication in S14. A process executed by the terminal device 100 in the present case is the same as that of Case A1 except that the public user name is written in the header of the acquisition request.

The printer 10 determines that the received command from the terminal device 100 is an acquisition request (YES in S100 and YES in S104) and determines that the digest authentication for the public user has succeeded (YES in S102). In the present case, the printer determines that the administrator authentication is "Necessary" for the OID of the IP address (YES in S142 of FIG. 8) and further determines that the authenticated user is not the administrator (NO in S144). The printer 10 then adds the OID of the IP address and the failure status to a process response (S156).

A process executed by the printer 10 for the OID of the number of printed sheets in the present case is the same as that of Case A1.

In the present case, the authenticated user is the public user, and thus the MIB value of the IP address with a high security level is not added to the process response, while the MIB value of the number of printed sheets with a low security level is added to the process response to the acquisition request.

(Case B1; FIG. 9) As an example, Case B1 is conceived in which the user designates an IP address and a print setting as two items by the writing operation in S20 of FIG. 4, inputs a new IP address and a value of a new print setting, and inputs the administrator name and a password for the user authentication in S24.

In the present case, the terminal device 100 determines that the administrator authentication is "Necessary" for the OID of the IP address (YES in S64 of FIG. 6) and writes the administrator name in the header of the writing request (S66 in FIGS. 6 and S24 in FIG. 4). The terminal device 100 then send the printer 10 the writing request including the OID of the IP address, the OID of the print setting, the new IP address, and the new print setting (S26).

The printer 10 determines that the received command from the terminal device 100 is a writing request (YES in S100 and YES in S108) and determines that the digest authentication for the administrator has succeeded (YES in S102). In the present case, the printer 10 determines that the administrator authentication is "Necessary" for the OID of the IP address (YES in S172 of FIG. 9) and further determines that the authenticated user is the administrator (YES in S174). The printer 10 writes the new IP address included in the writing request in the database 50 (S180). The printer 10 then adds the OID of the IP address and the success status to a process response (S182).

Further, the printer 10 determines that the administrator authentication is "Unnecessary" for the OID of the print setting (NO in S172), skips the determination in S174, and writes the new print setting included in the writing request in the database 50 (S180). The printer 10 then adds the OID of the print setting and the success status to the process response (S182).

In the present case, the authenticated user is the administrator, and thus both the MIB value of the IP address with a high security level and the MIB value of the print setting with a low security level are written in the database 50.

(Case B2; FIG. 9) The present case is the same as Case B1 except that public user name and a password are inputted for the user authentication in S14. A process executed by the terminal device 100 in the present case is the same as that of Case B1 except that public user name is written in the header of the writing request.

The printer 10 determines that the received command from the terminal device 100 is a writing request (YES in S100 and YES in S108) and determines that the digest authentication for the public user has succeeded (YES in S102). In the present case, the printer 10 determines that the administrator authentication is "Necessary" for the OID of the IP address (YES in S172 of FIG. 9) and further determines that the authenticated user is not the administrator (NO in S174). The printer 10 then adds the OID of the IP address and the failure status to a process response (S186).

A process executed by the printer 10 for the OID of the print setting in the present case is the same as that of Case B1.

In the present case, the authenticated user is the public user, and thus the MIB value of the IP address with a high security level is not written in the database 50, while the MIB value of the print setting with a low security level is written in the database 50.

(Effects of First Embodiment) Values with different security levels coexist in the MIB database 50. According to the configuration of the present embodiment, access to MIB values with low security levels (i.e., MIB values for which the administrator authentication is set as "Unnecessary") is permitted regardless of whether the user of the terminal device 100 is authenticated as the administrator or not. On the other hand, access to MIB values with high security levels (i.e., MIB values for which the administrator authentication is set as "Necessary") is not permitted unless the user of the terminal device 100 is authenticated as the administrator. Access to the MIB database 50 can be executed with consideration given to the coexistence of values with different security levels.

(Correspondence Relationships) The printer 10, the database 50, the authentication table 52, and the memory 34 are examples of "communication device", "database", "first list", and "first memory", respectively. The terminal device 100, the application 142, the CPU 132, the authentication table 152, and the memory 134 are examples of "terminal device", "computer-readable instructions", "processor", "second list", and "second memory", respectively. The acquisition request and writing request are examples of "access request". The failure status and the process response including the failure status are examples of "failure information" and "failure response", respectively. The administrator is an example of "specific user". The OID corresponding to the number of printed sheets in Case A1 in FIG. 8 is an example of "first OID". The MIB value corresponding to the number of printed sheets in Case A1 in FIG. 8 is an example of "first value". The MIB value corresponding to the number of printed sheets in Case A1 in FIG. 8 and the success status in Case B1 in FIG. 9 are examples of "first information". The OID corresponding to the IP address in Case A1 in FIG. 8 is an example of "second OID". The MIB value corresponding to the IP address in Case A1 in FIG. 8 is an example of "second value". The MIB value corresponding to the IP address in Case A1 in FIG. 8 and the success status in Case B1 in FIG. 9 are examples of "second information".

S104 or S108 in FIG. 7 is an example of "receive an access request from a terminal device". S106 or S110 in FIG. 7 is an example of "execute access to a value in the database". S16 or S26 in FIG. 4 is an example of "send an access request to a communication device". S30 in FIG. 4 is an example of "receive a response to the access request".

(Second Embodiment) The present embodiment is the same as the first embodiment except that authentication tables 54 and 154 are different and that an acquisition request generation process, writing request generation process, acquisition request process, and writing request process are different.

As illustrated in FIG. 2, the authentication table 54 of the present embodiment stores individual user authentication value in addition to OID and administrator authentication value. The Individual user authentication value indicates one of "Necessary" indicating that individual user authentication is necessary and "Unnecessary" indicating that individual user authentication is unnecessary. As illustrated in FIG. 3, the authentication table 154 of the present embodiment is identical to the authentication table 54 of the present embodiment.

Figure 10:
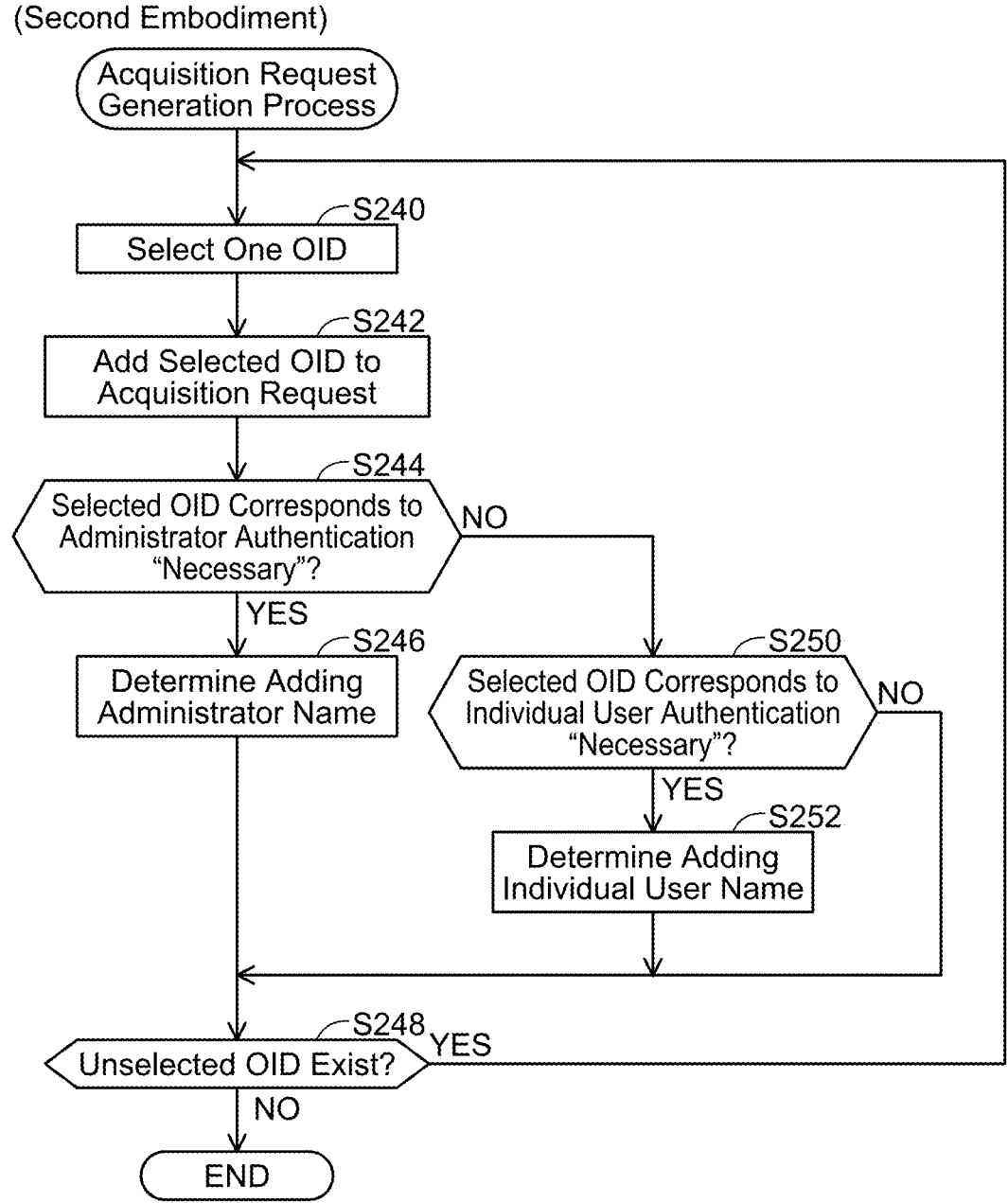
FIG. 10 illustrates a flowchart of an acquisition request generation process.

(Acquisition Request Generation Process; FIG. 10) S240 to S248 are the same as S40 to S48 in FIG. 5. When determining that an administrator authentication value stored in association with the one OID selected in S240 indicates "Unnecessary" in the authentication table 154 (NO in S244), the CPU 132 proceeds to S250. In S250, the CPU 132 specifies an individual user authentication value stored in association with the one OID selected in S240 in the authentication table 154. The CPU 132 then determines whether the specified individual user authentication value indicates "Necessary".

When determining that the specified individual user authentication value indicates "Necessary" (YES in S250), the CPU 132 decides in S252 to write an authentication parameter including an individual user name in the header of the acquisition request. Thus, in S14 of FIG. 4, the authentication parameter including the individual user name is written in the acquisition request. When S252 is completed, the CPU 132 proceeds to S248.

When determining that the specified individual user authentication value indicates "Unnecessary" (NO in S250), the CPU 132 skips S252 and proceeds to S248.

Figure 11:
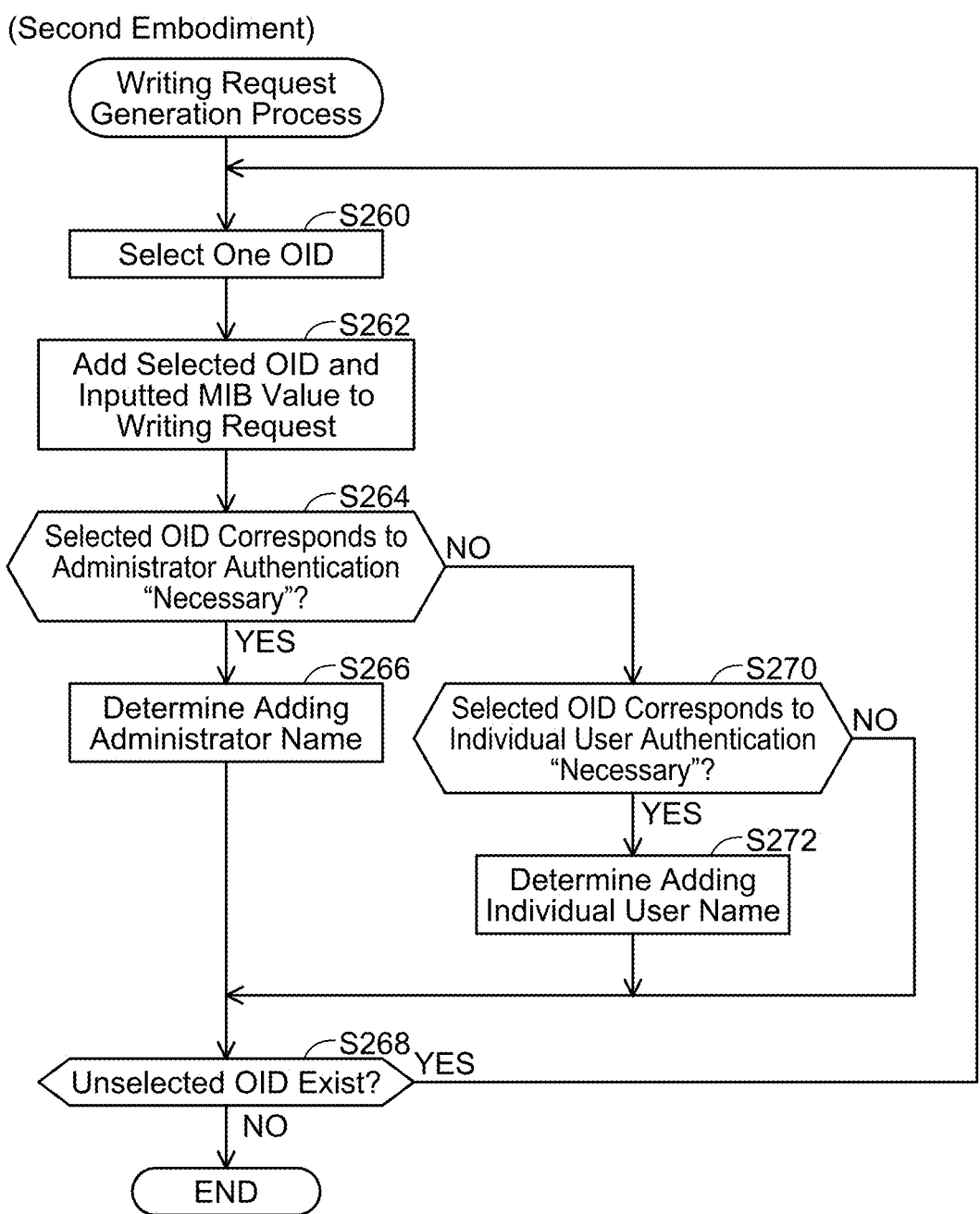
FIG. 11 illustrates a flowchart of a writing request generation process.

(Write Request Generation Process; FIG. 11) S260 to S268 are the same as S60 to S68 in FIG. 6. When determining that an administrator authentication value stored in association with the one OID selected in S260 indicates "Unnecessary" in the authentication table 154 (NO in S264), the CPU 132 proceeds to S270. S270 is the same as S250 in FIG. 10.

When determining that the specified individual user authentication value indicates "Necessary" (YES in S270), the CPU 132 proceeds to S272. S272 is the same as S262 in FIG. 10 except that the writing request is used. When S272 is completed, the CPU 132 proceeds to S268.

When determining that the specified individual user authentication value indicates "Unnecessary" (NO in S270), the CPU 132 skips S272 and proceeds to S268.

Figure 12:
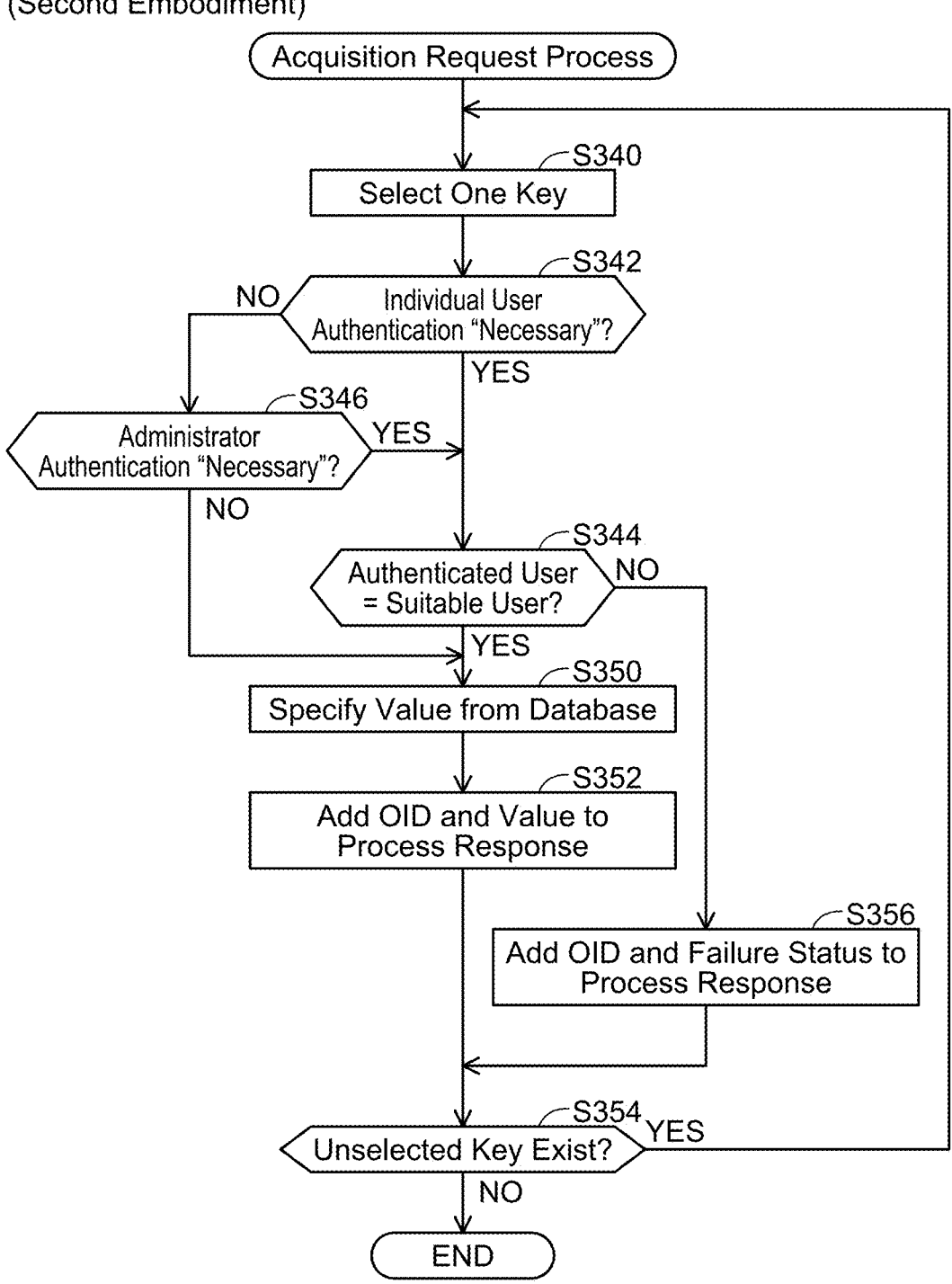
FIG. 12 illustrates a flowchart of an acquisition request process.

(Acquisition Request Process; FIG. 12) S340 is the same as S140 in FIG. 8. In S342, the CPU 32 specifies an OID associated with the one "key" selected in S340 in the acquisition request. The CPU 32 specifies an individual user authentication value stored in association with the specified OID in the authentication table 54. The CPU 32 determines whether the specified individual user authentication value indicates "Necessary".

When determining that the specified individual user authentication value indicates "Necessary" (YES in S342), the CPU 32 proceeds to S344.

When determining that the specified individual user authentication value indicates "Unnecessary" (NO in S342), the CPU 32 proceeds to S346. S346 is the same as S142 in FIG. 8. When determining that the specified administrator authentication value indicates "Necessary" (YES in S346), the CPU 32 proceeds to S344.

In S344, the CPU 32 determines whether the authenticated user is an eligible person. In case of determining YES in S342, the eligible person is the individual user indicated by the individual user name written in the header of the acquisition request. On the other hand, in case of determining YES in S346, the eligible person is the administrator indicated by the administrator name written in the header of the acquisition request.

When determining that the authenticated user is the eligible person (YES in S344), the CPU 32 proceeds to S350 to S354. S350 to S354 are the same as S150 to S154 in FIG. 8.

When determining that the authenticated user is not the eligible person (NO in S344), the CPU 32 proceeds to S356. S356 is the same as S156 in FIG. 8.

Figure 13:
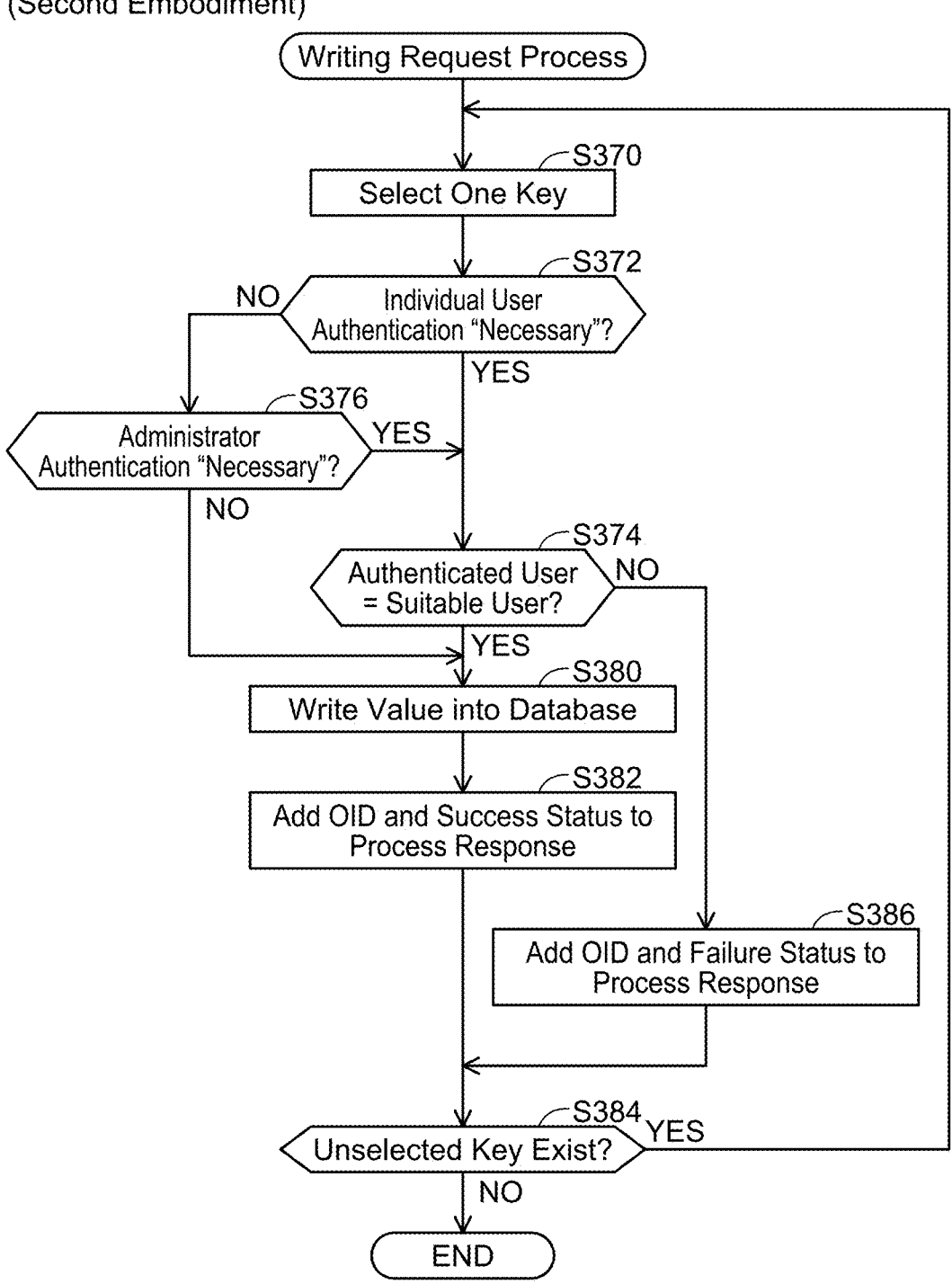
FIG. 13 illustrates a flowchart of a writing request process.

(Writing Request Process; FIG. 13) S370 is the same as S170 in FIG. 9. S372 is the same as S342 in FIG. 12 except that the writing request is used.

When determining that the specified individual user authentication value indicates "Necessary" (YES in S372), the CPU 32 proceeds to S374.

When determining that the specified individual user authentication value indicates "Unnecessary" (NO in S372), the CPU 32 proceeds to S376. S376 is the same as S172 in FIG. 9. When determining that the specified administrator authentication value indicates "Necessary" (YES in S376), the CPU 32 proceeds to S374. S374 is the same as S344 in FIG. 12 except that the writing request is used.

When determining that the authenticated user is the eligible person (YES in S374), the CPU 32 proceeds to S380 to S384. S380 to S384 are the same as S180 to S184 in FIG. 9.

When determining that the authenticated user is not the eligible person (NO in S374), the CPU 32 proceeds to S386. S386 is the same as S186 in FIG. 9.

(Effects of Second Embodiment) For example, MIB values for which the individual user authentication "Necessary" is set are information set by the individual user (e.g., a list of telephone numbers, etc.). According to the configuration of the present embodiment, access to MIB values in the database 50 for which the individual user authentication "Necessary" is set can be executed by the individual user authentication, without need of the administrator authentication. Since the individual user other than the administrator is permitted to access a part of the database 50, convenience for the individual user is improved.

In the present embodiment, a person determined as the eligible person in S374 is the individual user in case of YES in S372 or the administrator in case of YES in S376. That is, in the present embodiment, there are MIB values that the individual user can access but the administrator cannot. In a modification, a person determined as eligible person in S374 may be the individual user or the administrator in case of YES in S372 and the eligible person may be the administrator in case of YES in S376. That is, in the modification, the administrator can access MIB values that the individual user can access.

(Correspondence Relationships) The OID corresponding to the individual user authentication "Necessary" and the MIB value corresponding to this OID are examples of "third OID" and "third value", respectively. The authentication table 54 and the authentication table 154 are examples of "first list" and "second list", respectively.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

(Modification 1) The "communication device" is not limited to the printer 10 and may be, for example, a terminal device such as a desktop PC, a server, or the like.

(Modification 2) S102 in FIG. 7 may not be executed. In this instance, for example, in S144 of FIG. 8, the determination that the authenticated user is not the administrator includes that authentication is not executed for any user. In the present modification, Authentication being not executed for any user is an example of "the user of the terminal device is not authenticated as the specific user".

(Modification 3) S156 in FIGS. 8 and S186 in FIG. 9 may not be executed. In the present embodiment, the "failure response" may be omitted.

(Modification 4) One of the authentication table 52 (or 54) of the printer 10 and the authentication table 152 (or 154) of the terminal device 100 may be omitted. In the present modification, one of the "first list" and the "second list" may be omitted.

(Modification 5) Notification executed by "notify that authentication for the specific user is required" is not limited to the display of input screen in S34 of FIG. 4 and may be, for example, display of a message indicating that the administrator authentication is required, audio output of the message, etc.

(Modification 6) S34 in FIG. 4 may not be executed. In the present modification, "notify that authentication for the specific user is required" may be omitted.

(Modification 7) In the embodiments above, the processes of FIGS. 4 to 13 are implemented by the CPU 32 (or 132) executing the program 40 (or 140). Instead of this, at last one of these processes may be implemented by hardware such as a logic circuit, etc.

What is claimed is:

1. A communication device comprising:

a database storing, for each of a plurality of object IDs (OIDs) of Management Information Base (MIB), a value in association with the OID, the plurality of OIDs including a first OID associated with a first value and a second OID associated with a second value where the second value has a higher security level than the first value; and a controller configured to:

receive an access request from a terminal device, the access request being for requesting access to a value in the database, and the access request including one or more OIDs among the plurality of OIDs;

determine whether the access request is for the first OID and/or the second OID; and execute access to a value in the database according to the determination, wherein in a case where it is determined that the access request contains the first OID, the controller executes access to the first value stored in the database in association with the first OID without authenticating a user of the terminal device as a specific user, in a case where it is determined that the access request includes the second OID, authenticating the user of the terminal device and in a case that the user of the terminal device is authenticated as the specific user, the controller executes access to the second value stored in the database in association with the second OID, and in a case where it is determined that the access request includes the second OID and the user of the terminal device is not authenticated as the specific user, the access to the second value in the database is not executed.

2. The communication device according to claim 1, wherein the user of the terminal device not being authenticated as the specific user includes that the user of the terminal device is authenticated as a user different from the specific user.

3. The communication device according to claim 2, wherein the plurality of OIDs further includes a third OID corresponding to a third value, and wherein in a case where the access request includes the third OID, which is different from the first OID, and the user of the terminal device is authenticated as an individual user different from the specific user, the controller executes access to the third value stored in the database in association with the third OID, and in a case where the access request includes the third OID and the user of the terminal device is not authenticated as any one of the specific user and the individual user, the access to the third value in the database is not executed.

4. The communication device according to claim 1, wherein the access request is a command according to Hypertext Transfer Protocol Secure (HTTPS).

5. The communication device according to claim 1, wherein the controller is further configured to:

in the case where it is determined that the access request includes the second OID and the user of the terminal device is not authenticated as the specific user, send a failure response to the terminal device as a response to the access request, the failure response indicating that the access to the second value has failed.

6. The communication device according to claim 1, wherein the access request is one of an acquisition request for acquiring a value stored in the database from the database and a writing request for writing a new value in the database.

7. The communication device according to claim 1, wherein the communication device further comprises a memory storing an indication of a security level for a value associated with the OID, and the controller is further configured to determine, by using the indication of the security level, the security level of a value associated with an OID in the access request.

8. The communication device according to claim 1, wherein authentication of the user of the terminal device uses digest authentication.

9. The communication device according to claim 1, wherein the controller is further configured to in a case that it is determined that the access request includes the second OID and the user of the terminal device is not authenticated as the specific user, send the terminal device a response including information for causing the terminal device to display an input screen for input of a user name and a password.

10. A non-transitory computer-readable recording medium storing computer-readable instructions for a termi-nal device, wherein the computer-readable instructions, when executed by a processor of the terminal device, cause the terminal device to:

send an access request to a communication device, the access request being a command for requesting access to a value in a database of the communication device, the database storing, for each of a plurality of object IDs (OIDs) of Management Information Base (MIB), a value in association with the OID, the plurality of OIDs including a first OID associated with a first value and a second OID associated with a second value where the second value has a higher security level than the first value, and the access request including one or more OIDs among the plurality of OIDs that are specified by a user of the terminal device; and receive a response to the access request from the com-munication device, wherein in a case where the access request includes the first OID, the response includes first information indicating that access to a first value stored in the database in asso-ciation with the first OID has succeeded without a user of the terminal device being authenticated as a specific user, in a case where the access request includes the second OID, which is different from the first OID, and the user of the terminal device is authenticated as the specific user, the response includes second information indicat-ing that access to a second value stored in the database in association with the second OID has succeeded, and in a case where the access request includes the second OID and the user of the terminal device is not authenticated as the specific user, the response does not include the second information.

11. The non-transitory computer-readable recording medium according to claim 10, wherein the user of the terminal device not being authenticated as the specific user includes that the user of the terminal device is a user different from the specific user.

12. The non-transitory computer-readable recording medium according to claim 10, wherein the plurality of OIDs further includes a third OID corre-sponding to a third value, and wherein in a case where the access request includes the third OID, which is different from the first OID, and the user of the terminal device is authenticated as an individual user different from the specific user, the response includes third information indicating that access to the third value stored in the database in association with the third OID has succeeded, and in a case where the access request includes the third OID and the user of the terminal device is not authenticated as any one of the specific user and the individual user, the response does not include the third information.

13. The non-transitory computer-readable recording medium according to claim 10, wherein the access request is a command according to Hypertext Transfer Protocol Secure (HTTPS).

14. The non-transitory computer-readable recording medium according to claim 10, wherein in the case where the access request includes the second OID and the user of the terminal device is not authen-ticated as the specific user, the response includes failure information indicating that the access to the second value has failed, and the computer-readable instructions further cause the ter-minal device to:

in a case where the response including the failure infor-mation is received from the communication device, notify that authentication for the specific user is required.

15. The non-transitory computer-readable recording medium according to claim 10, wherein the access request is one of an acquisition request for acquiring a value stored in the database from the database and a writing request for writing a new value in the database.

16. The non-transitory computer-readable recording medium according to claim 10, wherein the terminal device comprises a memory storing an indi-cation of a security level for a value respectively with the OID, the computer-readable instructions further cause the ter-minal device to:

determine, by using the indication of the security level, whether authentication is required for a value associ-ated with an OID to be included in the access request, and in a case where it is determined, by using the indication of the security level, that authentication as the specific user is required for the value associated with the OID, add information indicating that the user of the terminal device is the specific user to the access request.

17. A non-transitory computer-readable recording medium storing computer-readable instructions for a com-munication device, wherein the communication device com-prises:

a processor; and a database storing, for each of a plurality of object IDs (OIDs) of Management Information Base (MIB), a value in association with the OID, the plurality of OIDs including a first OID associated with a first value and a second OID associated with a second value where the second value has a higher security level than the first value, wherein the computer-readable instructions, when executed by the processor, cause the communication device to:

receive an access request from a terminal device, the access request being for requesting access to a value in the database, and the access request including one or more OIDs among the plurality of OIDs;

determine whether the access request is for the first OID and/or the second OID; and execute access to a value in the database according to the determination, wherein in a case where it is determined that the access request includes the first OID the computer-readable instructions cause the communication device to access the first value stored in the database in association with the first OID without authenticating a user of the terminal device as a specific user, in a case where it is determined that the access request includes the second OID, which is different from the first OID, and the user of the terminal device is authenticated as the specific user, the computer-readable instructions cause the communication device to access the second value stored in the database in association with the second OID, and in a case where it is determined that the access request includes the second OID and the user of the terminal device is not authenticated as the specific user, the access to the second value in the database is not executed.

18. A control method of a communication device, wherein the communication device comprises a database storing, for each of a plurality of object IDs (OIDs) of Management Information Base (MIB), a value in association with the OID, the plurality of OIDs including a first OID associated with a first value and a second OID associated with a second value where the second value has a higher security level than the first value, wherein the control method comprises:

receiving an access request from a terminal device, the access request being for requesting access to a value in the database, and the access request including one or more OIDs among the plurality of OIDs;

determining whether the access request is for the first OID and/or the second OID; and executing access to a value in the database according to the determination, wherein in a case where it is determined that the access request includes the first OID, access to a first value stored in the database in association with the first OID is executed without authenticating a user of the terminal device as a specific user, in a case where it is determined that the access request includes the second OID, which is different from the first OID, and the user of the terminal device is authenticated as the specific user, access to a second value stored in the database in association with the second OID is executed, and in a case where it is determined that the access request includes the second OID and the user of the terminal device is not authenticated as the specific user, the access to the second value in the database is not executed.

19. A terminal device, comprising a controller, wherein the controller is configured to:

send an access request to a communication device, the access request being a command for requesting access to a value in a database of the communication device, the database storing, for each of a plurality of object IDs (OIDs) of Management Information Base (MIB), a value in association with the OID, the plurality of OIDs including a first OID associated with a first value and a second OID associated with a second value where the second value has a higher security level than the first value, and the access request including one or more OIDs among the plurality of OIDs that are specified by an user of the terminal device; and receive a response to the access request from the communication device, wherein in a case where the access request includes the first OID, the response includes first information indicating that access to the first value stored in the database in association with the first OID has succeeded without a user of the terminal device being authenticated as a specific user, in a case where the access request includes the second OID, which is different from the first OID, and the user of the terminal device is authenticated as the specific user, the response includes second information indicating that access to the second value stored in the database in association with the second OID has succeeded, and in a case where the access request includes the second OID and the user of the terminal device is not authenticated as the specific user, the response does not include the second information.

20. A control method of a terminal device, the method comprising:

sending an access request to a communication device, the access request being a command for requesting access to a value in a database of the communication device, the database storing, for each of a plurality of object IDs (OIDs) of Management Information Base (MIB), a value in association with the OID, the plurality of OIDs including a first OID associated with a first value and a second OID associated with a second value where the second value has a higher security level than the first value, and the access request including one or more OIDs among the plurality of OIDs that are specified by an user of the terminal device; and receiving a response to the access request from the communication device, wherein in a case where the access request includes the first OID, the response includes first information indicating that access to the first value stored in the database in association with the first OID has succeeded without a user of the terminal device being authenticated as a specific user, in a case where the access request includes the second OID, which is different from the first OID, and the user of the terminal device is authenticated as the specific user, the response includes second information indicating that access to the second value stored in the database in association with the second OID has succeeded, and in a case where the access request includes the second OID and the user of the terminal device is not authenticated as the specific user, the response does not include the second information.

* * * * *